(12) United States Patent
Reiter

(10) Patent No.: US 6,923,162 B2
(45) Date of Patent: Aug. 2, 2005

(54) SECURING SLEEVE FOR A FUEL INJECTION SYSTEM

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 10/466,465

(22) PCT Filed: Sep. 20, 2002

(86) PCT No.: PCT/DE02/03547

§ 371 (c)(1),
(2), (4) Date: Jul. 15, 2003

(87) PCT Pub. No.: WO03/046364

PCT Pub. Date: Jun. 5, 2003

(65) Prior Publication Data

US 2004/0050365 A1 Mar. 18, 2004

(30) Foreign Application Priority Data

Nov. 15, 2001 (DE) .......................... 101 56 021

(51) Int. Cl.⁷ ............................................. F02M 37/04
(52) U.S. Cl. ...................... 123/490; 123/468; 285/92
(58) Field of Search ................................. 123/470, 472, 123/456, 468, 469; 239/600, 585.1–585.5; 285/906, 80, 92, 902, 330, 117

(56) References Cited

U.S. PATENT DOCUMENTS

| 3,929,109 A | * | 12/1975 | Chamberlain ............... 123/468 |
| 4,143,625 A | * | 3/1979 | Kulke ........................ 123/470 |
| 4,295,452 A | | 10/1981 | Knapp et al. |
| 4,693,223 A | * | 9/1987 | Eshleman et al. .......... 123/468 |
| 5,058,930 A | * | 10/1991 | Schlosser ..................... 285/92 |
| 5,362,111 A | * | 11/1994 | Harbin ........................ 285/92 |
| 5,820,031 A | * | 10/1998 | Reiter et al. ............. 239/585.1 |
| 5,823,702 A | | 10/1998 | Bynum |
| 6,019,089 A | * | 2/2000 | Taylor et al. ................ 123/470 |
| 6,276,339 B1 | | 8/2001 | Meeker et al. |
| 6,318,340 B1 | * | 11/2001 | Zielfleisch et al. .......... 123/470 |
| 6,382,187 B1 | * | 5/2002 | Scollard et al. ............. 123/470 |

* cited by examiner

Primary Examiner—Carl S. Miller
(74) Attorney, Agent, or Firm—Kenyon & Kenyon

(57) ABSTRACT

A fuel-injection system for injecting fuel into an internal combustion engine, having at least one fuel injector and a fuel-distributor line, is provided for each fuel injector with a connecting piece, which is connectable to an inflow section of the fuel injector. The connecting piece is connectable to the fuel injector via a screw connection made up of a screw cap and a thread. A retaining sleeve is able to be slipped with form locking over the screw cap and a counter-hold section, matched in form, on the side of the thread, in order to prevent a twisting of the screw cap and the thread relative to one another.

12 Claims, 2 Drawing Sheets

SECURING SLEEVE FOR A FUEL INJECTION SYSTEM

FIELD OF THE INVENTION

The present invention relates to a fuel-injection system for injecting fuel into an internal combustion engine, and a device for connecting the fuel injector to a fuel-distributor line.

BACKGROUND INFORMATION

German Patent Application No. 28 29 057, discusses a fuel-injection system for supplying fuel to a mixture-compressing internal combustion engine having external ignition as a function of operating parameters. The fuel-injection system includes a metal fuel-distributor line, which, via at least one branch line, is connected to at least one fuel injector, the branch line being embodied as a metal tube and connected to the fuel injector by way of a threaded connection. Easily bendable metal is used as material for the branch line. Situated between the threaded connection on the branch line and the fuel injector are thin-walled metal bellows, which compensate for a lateral offset between the beginning point of the branch line on the fuel-distributor line and the fitting position of the fuel injector, and which damp the operating noises originating in the fuel injector.

Disadvantageous in the fuel-injection system from German Patent Application No. 28 29 057 is that the screw connection is not secured against an automatic loosening. Due to the vibrations of the internal combustion engine during operation, a screwed connection rigidly connected to the internal combustion engine is at a higher risk of coming unscrewed.

However, especially in the case of directly injecting fuel injectors and at the high pressures required in this context, the screwed connection is safety-relevant and should not come unscrewed under any circumstances. The known fuel-injection system provides no suggestion for securing a screwed connection.

SUMMARY OF THE INVENTION

In contrast, the fuel-injection system of the present invention has the advantage over the related art that the screw connection is unable to become unscrewed. Due to the retaining sleeve, the relative position of screw cap and thread may be fixed. The safety mechanism according to the present invention is also cost-effective and may be locked and released without special tools and may be reused as often as desired.

It is possible to situate the screw cap on the connecting piece and the plastic counter-hold section on the fuel injector, and to premold the plastic counter-hold section on the fuel injector.

The outer periphery of screw cap and the counter-hold section may be in the form of a polygon. In particular, the screw cap or the counter-hold section may be a hexagon and the other a polygon. This allows a more precise adjustment of the starting torque of the screwed connection, since smaller angle increments are possible. It may be sufficient for this purpose to combine a hexagon with a polygon, such as a double hexagon.

Furthermore, the retaining sleeve may be axially braced against a shoulder of the fuel injector, and tongues of the retaining sleeve, which may be radially flexible toward the inside, may be braced against the screw cap and may axially hold the retaining sleeve in position.

The retaining sleeve is unable to slide off by itself, for instance due to the vibrations of the internal combustion engine during operation.

The tongues may also engage in a radial groove formed on the screw cap or the fuel injector.

At one end, the retaining sleeve may have a widened section. When the retaining sleeve is slipped over the screw cap and the counter-hold section, with the widened section in the front, it is easier to slip on.

DETAILED DESCRIPTION

Figure 1:
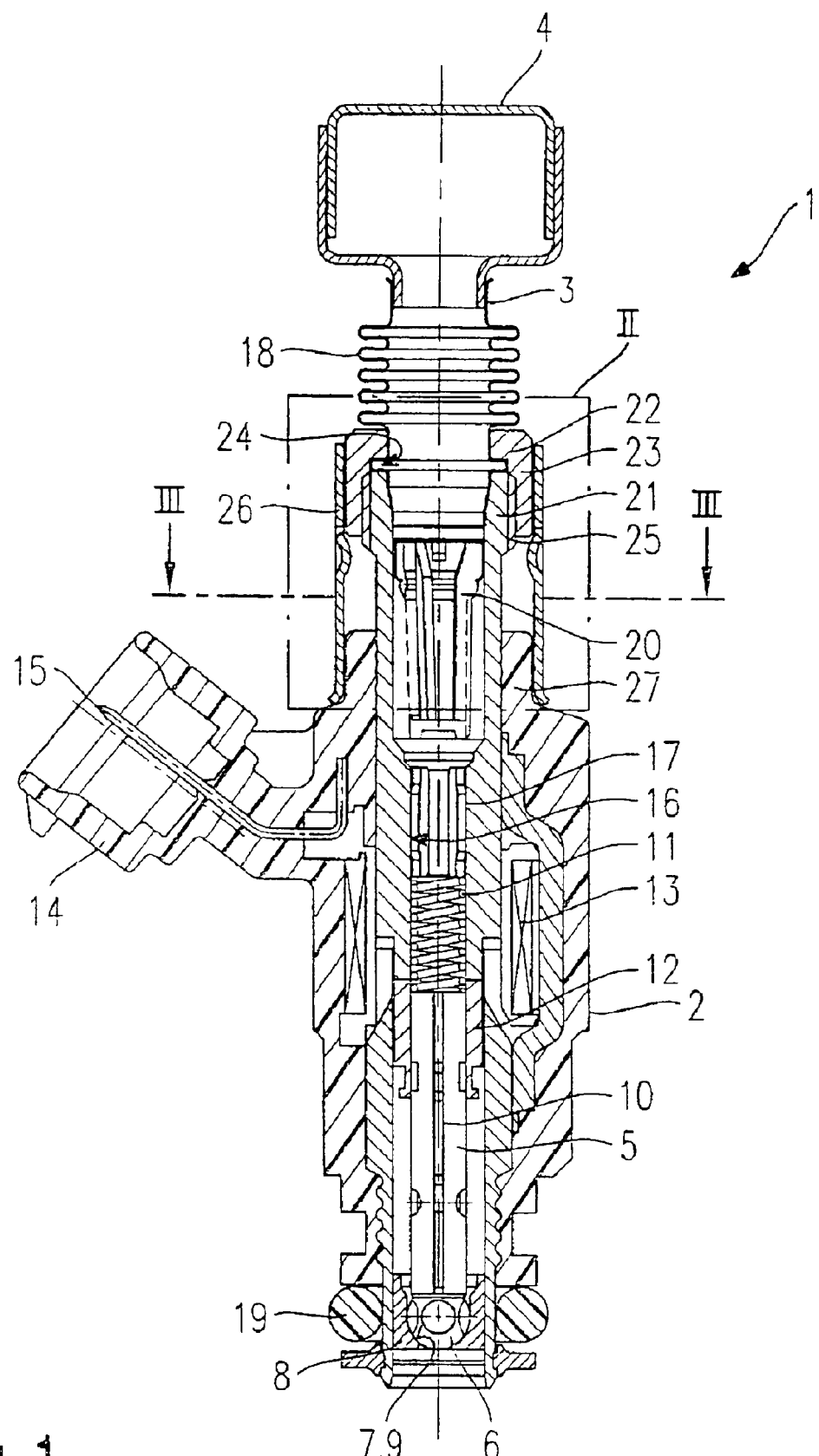
FIG. 1 shows a section through an exemplary embodiment of a fuel-injection system, in the sectional plane of a fuel injector and a connection piece of a fuel-distributor line.

FIG. 1 shows a section through a first exemplary embodiment of a fuel-injection system 1 in the sectional plane of a fuel injector 2 and a connecting piece 3 of a fuel-distributor line 4, the connecting piece 3 being formed by a metal expansion bellows 18. Fuel injector 2 has an inwardly opening valve needle 5 with a premolded valve-closure member 6. Valve-closure member 6 cooperates with a valve-seat surface 7 located on a valve-seat body 8 to form a valve-sealing seat 9. The fuel may flow to valve-sealing seat 9 through a bore 10 of valve needle 5. A valve spring 11 prestresses valve needle 5 and valve-closure member 6 against valve-sealing seat 9. Arranged in a bore 16 is a clamping element 17 via which the prestress of valve spring 11 may be adjusted.

In response to a magnetic coil 13 being energized, valve needle 5 may be able to be lifted off from valve-sealing seat 9 via an armature 12. The current may be supplied by way of a plug-in connection 14, which may be premolded on the housing of fuel injector 2, and via electric supply lines 15.

With the aid of an O-ring 19, the end of fuel injector 2 facing valve-sealing seat 9 may be sealed in a bore from a combustion chamber (not shown) or from an intake manifold of an internal combustion engine.

A filter element 20 may be located in the inflow of fuel from fuel-distributor line 4 to valve needle 5. Expansion bellows 18 is inserted in an inflow section 21 of fuel injector 2 by way of an appropriately formed end section and retained by a screw cap 23, which, using a flange 22, presses against an appropriately formed edge 24 of expansion bellows 18. Screw cap 23 engages in a thread 25, which may be premolded on inflow section 21 of fuel injector 2. A retaining sleeve 26, shown in cross section, encloses screw cap 23 radially on the outside in a slideable and form-locking manner. In the same way, screw cap 23 encloses a counter-hold section 27, which is formed on fuel injector 2 by extrusion of a plastic material.

Reference has been made to the connection of connecting piece 3 to fuel-distributor line 4, and to retaining sleeve 26. Therefore, the corresponding section is described in greater detail below on the basis of FIG. 2.

Figure 2:
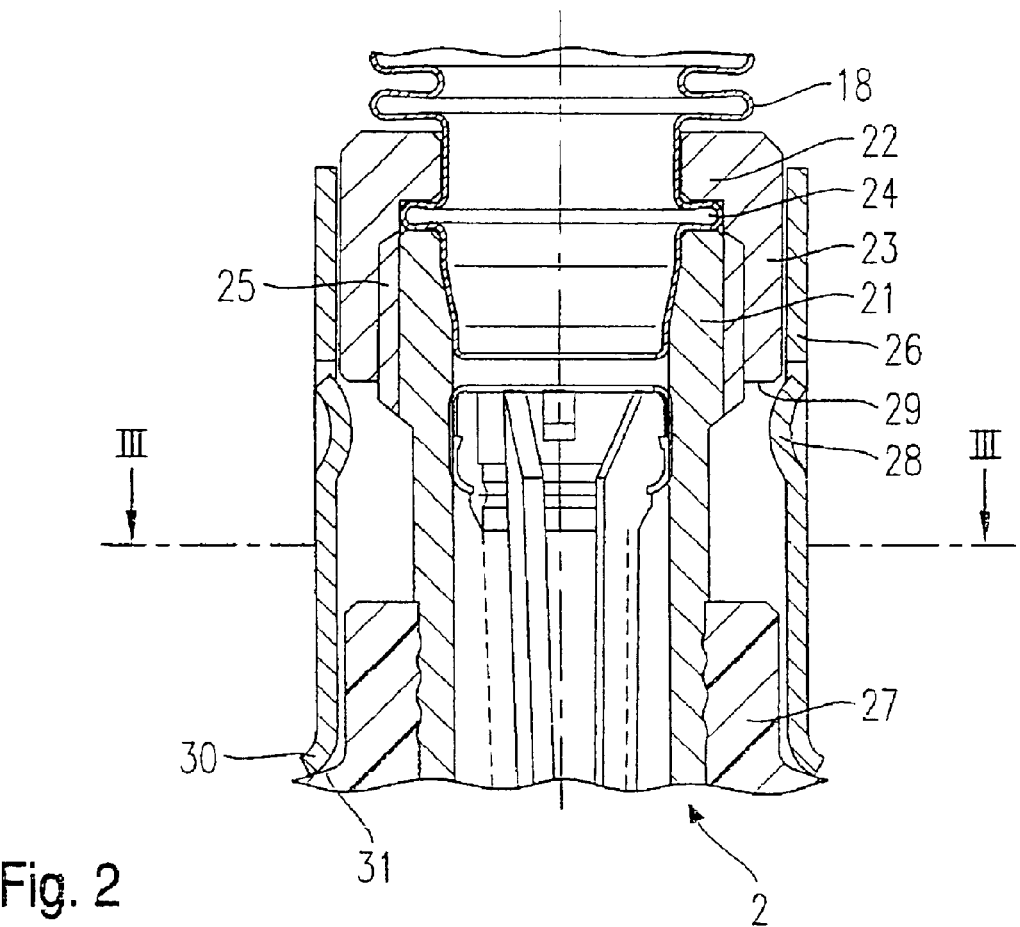
FIG. 2 shows a detail section in the region designated II in FIG. 2 of a retaining sleeve.

In order to clarify the first exemplary embodiment of the present invention, FIG. 2 shows a detail section, designated II in FIG. 1, in the region of retaining sleeve 26. Expansion bellows 18 of the connecting piece (not shown further) is inserted in inflow section 21 of fuel injector 2 by way of a corresponding end section. Expansion bellows 18 is held in this position by flange 22 of screw cap 23 pressing edge 24 against inflow section 21. In the process, screw cap 23 engages in thread 25 formed on inflow section 21. Counter-hold section 27 may be formed from plastic on fuel injector 2, for example by extrusion-coating with a plastic material. Retaining sleeve 26 abuts against screw cap 23 and counter-hold section 27 in a form-locking manner. Tongues 28, which flexibly press radially inward because of internal stress, abut against an axial step 29, which may be formed by the lower end of screw cap 23. At its end facing fuel injector 2, retaining sleeve 26 may have a widened section 30, resting on a shoulder 31 of fuel injector 2 by way of this end.

Figure 3:
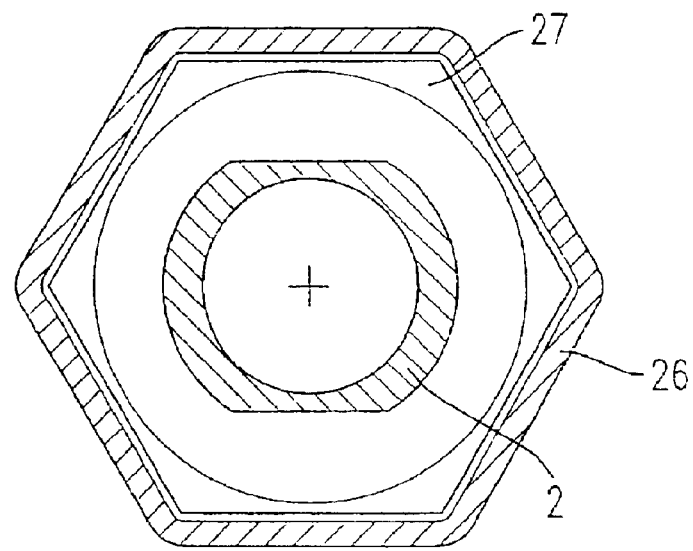
FIG. 3 shows the sectional plane III in FIGS. 1 and 2.

In a plan view, FIG. 3 shows the sectional plane designated III in FIGS. 1 and 2. Retaining sleeve 26 encloses counter-hold section 27 in form-locking manner. Positioned inside, in cross section, is fuel injector 2.

When fuel-injection system 1 is mounted, screw cap 23 is screwed onto thread 25 using a prescribed torque. This may be opposed by a suitable tool on counter-hold section 27. Retaining sleeve 26, which has already been mounted in the region of connecting piece 3, is thereupon slipped over screw cap 23 in the direction of fuel injector 2. Widened section 30 of retaining sleeve 26 facilitates this sliding process. If screw cap 23 is rotated on thread 25 to the point where it assumes an outer form that is identical to, or fits with, counter-hold section 27, retaining sleeve 26 may be slipped on, up to the point where its widened end 30 abuts against shoulder 31. So as to require only the least possible number of rotations of screw cap 23 on thread 25 and, thus, the smallest possible deviation from the predefined torque, screw cap 23 may be a polygon, for instance, such as a double hexagon. If a counter-hold section 27 is formed in the shape of a hexagon, and a retaining sleeve 26 likewise formed as a hexagon and mounted thereon in a form-locking manner, only a maximum rotation by 15°, and not 30°, is required to slide the retaining sleeve on completely. As soon as retaining sleeve 26 abuts against shoulder 31, tongues 28 bend radially inward and prevent retaining sleeve 26 from sliding off. If retaining sleeve 26 is to be pushed out of its position in an upward direction, the spring force of tongues 28 must first be overcome once these abut against axial step 29.

This advantageously simple and cost-effective design is thus able to achieve a protection against a loosening of the screw connection. In particular, it may be locked and unlocked as often as needed, and no special tools are required for this purpose.

The present invention is not restricted to the exemplary embodiment shown and is also suited, for instance, for fuel injection systems of mixture-compressing internal combustion engines, having self-ignition.

What is claimed is:

1. A fuel-injection system for injecting fuel into an internal combustion engine comprising:
   at least one fuel injector;
   a retaining sleeve; and
   a fuel-distributor line having a connecting piece connectable to an inflow section of each of the at least one fuel injector via a screw connection made up of a screw cap and a thread;
   wherein the retaining sleeve:
      detachably engages the screw cap and a counter-hold section;
      is slippable with form locking over the screw cap and the counter-hold section, matched in form, on the fuel injector, to prevent twisting of the screw cap and the thread relative to one another; and
      includes tongues that bend radially inward and are arranged to prevent the retaining sleeve from disengagement from the screw cap and counter-hold section.

2. The fuel-injection system of claim 1, wherein the screw cap is arranged on the connecting piece and the counter-hold section on the fuel injector.

3. The fuel-injection system of claim 2, wherein the counter-hold section is part of a plastic-extrusion coating of the fuel injector.

4. A fuel-injection system for injecting fuel into an internal combustion engine comprising:
   at least one fuel injector;
   a retaining sleeve; and
   a fuel-distributor line having a connecting piece connectable to an inflow section of each of the at least one fuel injector via a screw connection made up of a screw cap and a thread;
   wherein the retaining sleeve is slippable with form locking over the screw cap and a counter-hold section, matched in form, on the fuel injector, to prevent twisting of the screw can and the thread relative to one another; and
   wherein the screw cap has a polygon-shaped outer periphery.

5. A fuel-injection system for injecting fuel into an internal combustion engine comprising:
   at least one fuel injector;
   a retaining sleeve; and
   a fuel-distributor line having a connecting piece connectable to an inflow section of each of the at least one fuel injector via a screw connection made up of a screw cap and a thread;
   wherein the retaining sleeve is slippable with form locking over the screw cap and a counter-hold section, matched in form, on the fuel injector, to prevent twisting of the screw cap and the thread relative to one another; and
   wherein the counter-hold section has a polygon-shaped outer periphery.

6. A fuel-injection system for injecting fuel into an internal combustion engine comprising:
   at least one fuel injector;
   a retaining sleeve; and
   a fuel-distributor line having a connecting piece connectable to an inflow section of each of the at least one fuel injector via a screw connection made up of a screw cap and a thread;
   wherein the retaining sleeve is slippable with form locking over the screw cap and a counter-hold section, matched in form, on the fuel injector, to prevent twisting of the screw cap and the thread relative to one another; and
   wherein the screw cap has one of a hexagon-shaped and a double-hexagon-shaped outer periphery.

7. A fuel-injection system for injecting fuel into an internal combustion engine comprising:
   at least one fuel injector;
   a retaining sleeve; and
   a fuel-distributor line having a connecting piece connectable to an inflow section of each of the at least one fuel injector via a screw connection made up of a screw cap and a thread;

wherein the retaining sleeve is slippable with form locking over the screw cap and a counter-hold section, matched in form, on the fuel injector, to prevent twisting of the screw cap and the thread relative to one another; and wherein the counter-hold section has one of a hexagon-shaped and a double-hexagon-shaped outer periphery.

8. The fuel-injection system of claim 4, wherein the retaining sleeve includes tongues that are radially elastic toward an inside of the fuel-injection system, that are axially braced against at least one axial step, and that axially secure the retaining sleeve in position.

9. The fuel-injection system of claim 8, wherein the retaining sleeve is braced against a shoulder of the fuel injector and the tongues are braced against the screw cap.

10. The fuel-injection system of claim 8, wherein the tongues engage in a radial groove formed on one of the screw cap and the fuel injector.

11. The fuel-injection system of claim 1, wherein the retaining sleeve includes a widened section at one end.

12. A fuel-injection system for injecting fuel into an internal combustion engine comprising:
    at least one fuel injector;
    a retaining sleeve;
    a fuel-distributor line having a connecting piece connectable to an inflow section of each of the at least one fuel injector via a screw connection made up of a screw cap and a thread; and
    a safety mechanism in accordance with which the retaining sleeve is detachably engageable with the screw cap and a counter-hold section;
    wherein the retaining sleeve is slippable with form locking over the screw cap and the counter-hold section, matched in form, on the fuel injector to prevent twist of the screw cap and the thread relative to one another; and wherein the retaining sleeve includes tongues that bend radially inwardly and are arranged to prevent the retaining sleeve from sliding off.

* * * * *